Figure 19:
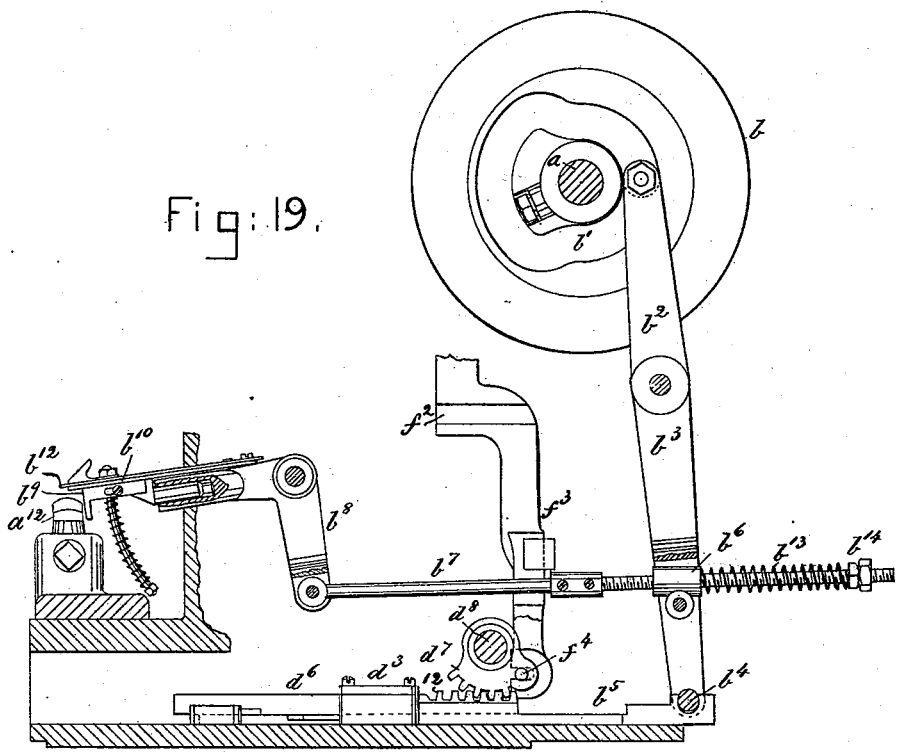

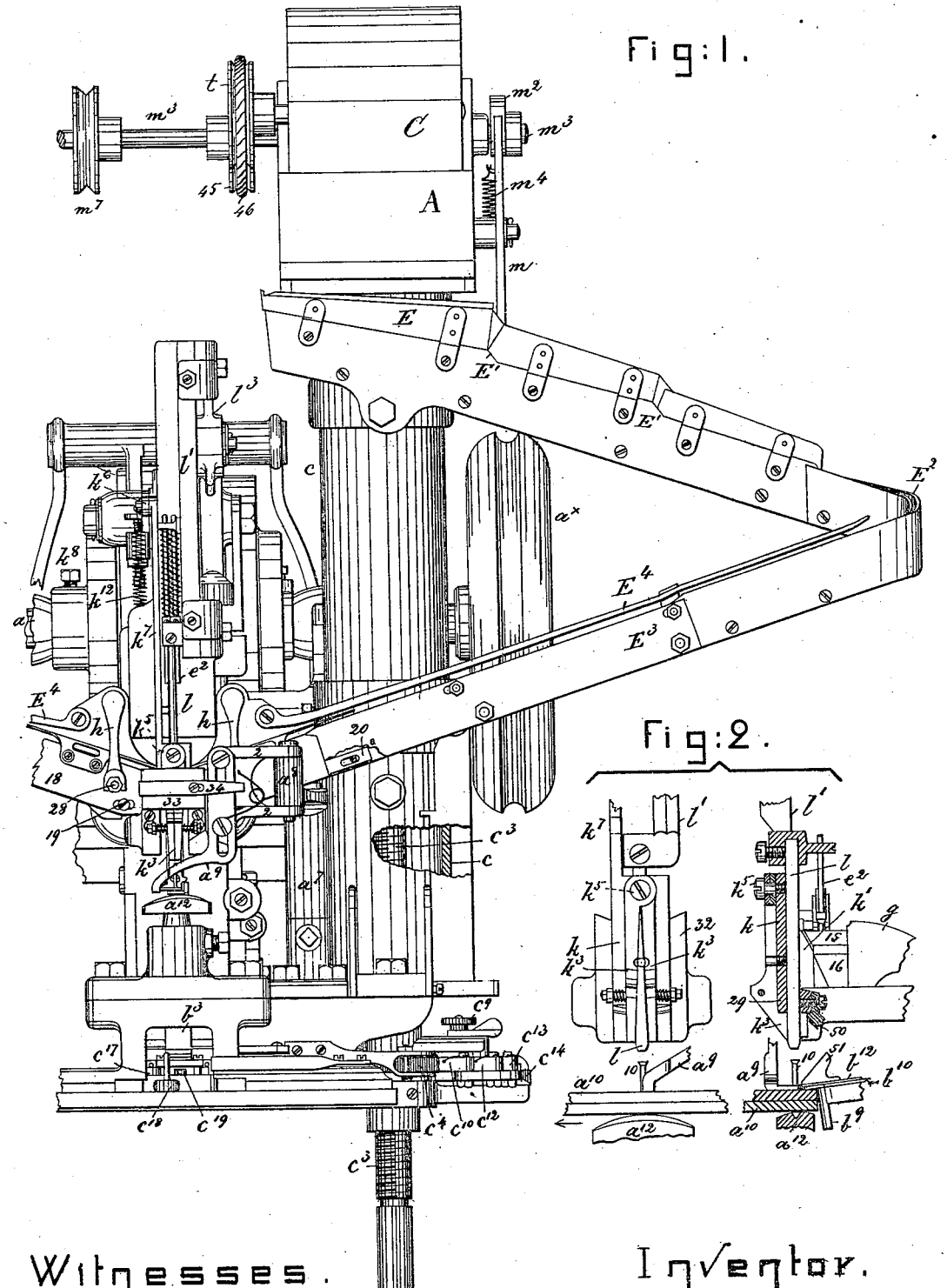

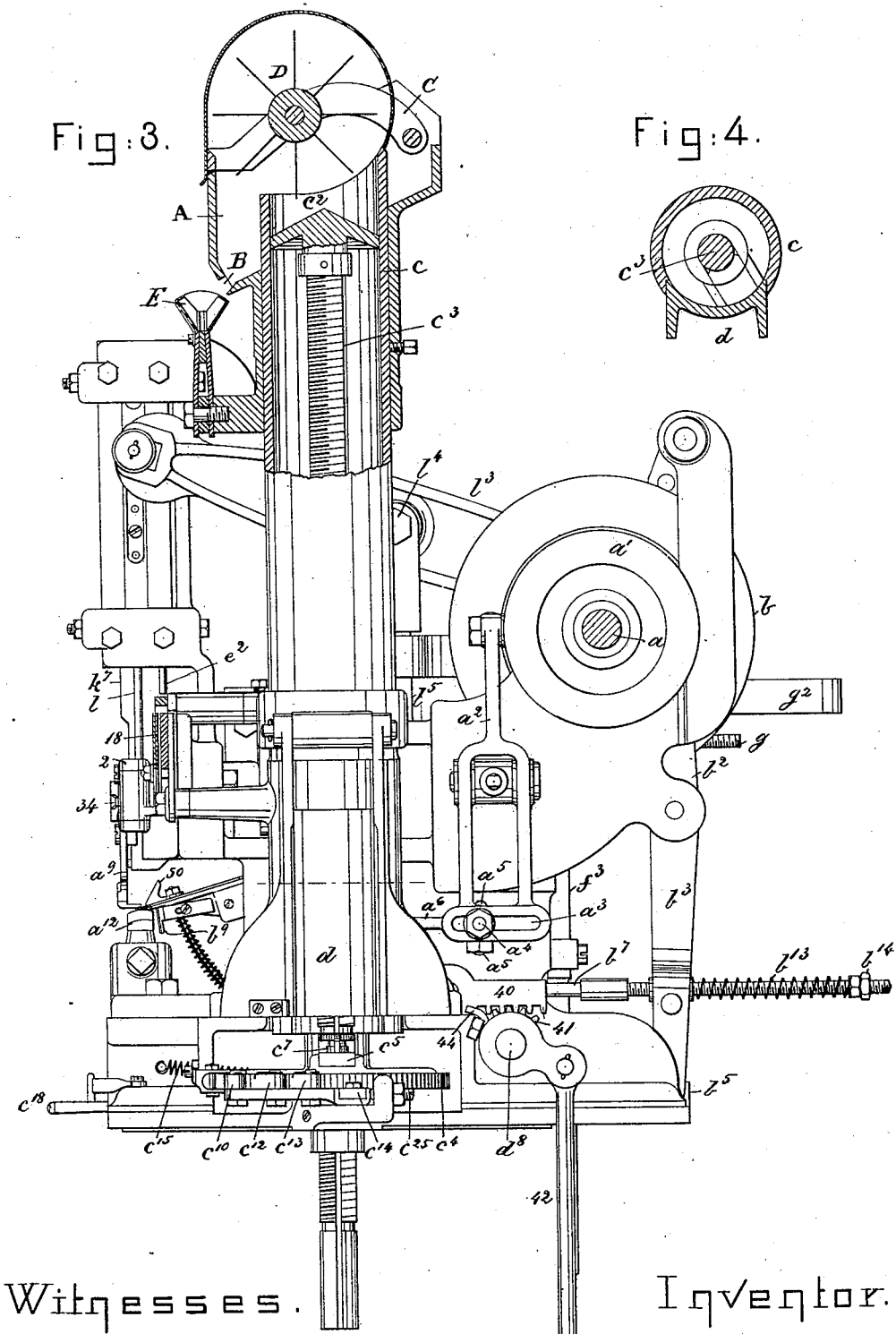

(No Model.) 10 Sheets—Sheet 3.
H. P. FAIRFIELD.
Nailing Machine for Boots and Shoes.
No. 236,568. Patented Jan. 11, 1881.
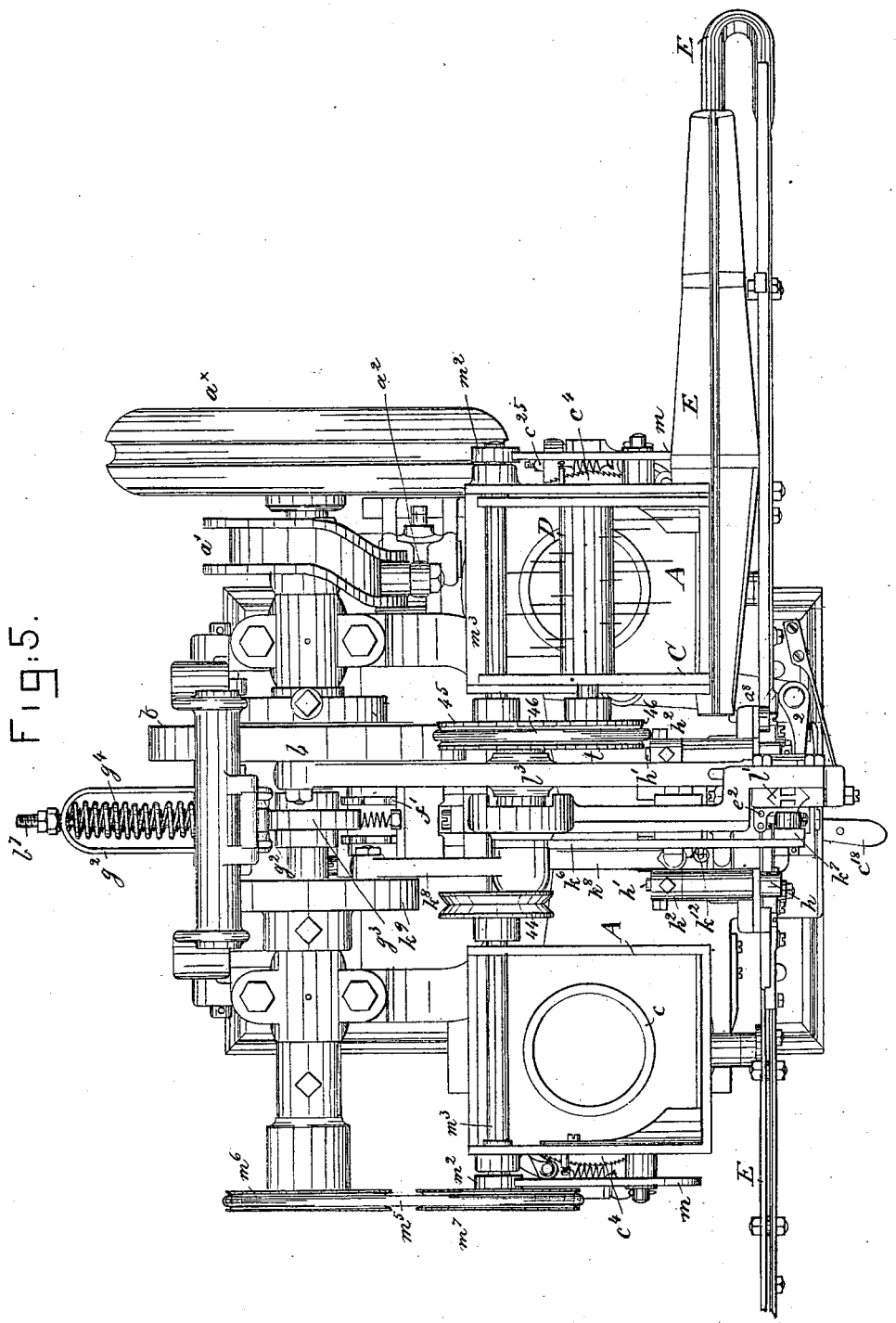
Witnesses.
L. F. Connor.
Arthur Reynolds.
Inventor.
Hadley P. Fairfield
by Crosby Gregory Attys (No Model.)
H. P. FAIRFIELD.
Nailing Machine for Boots and Shoes.
No. 236,568.    Patented Jan. 11, 1881.
10 Sheets—Sheet 4.
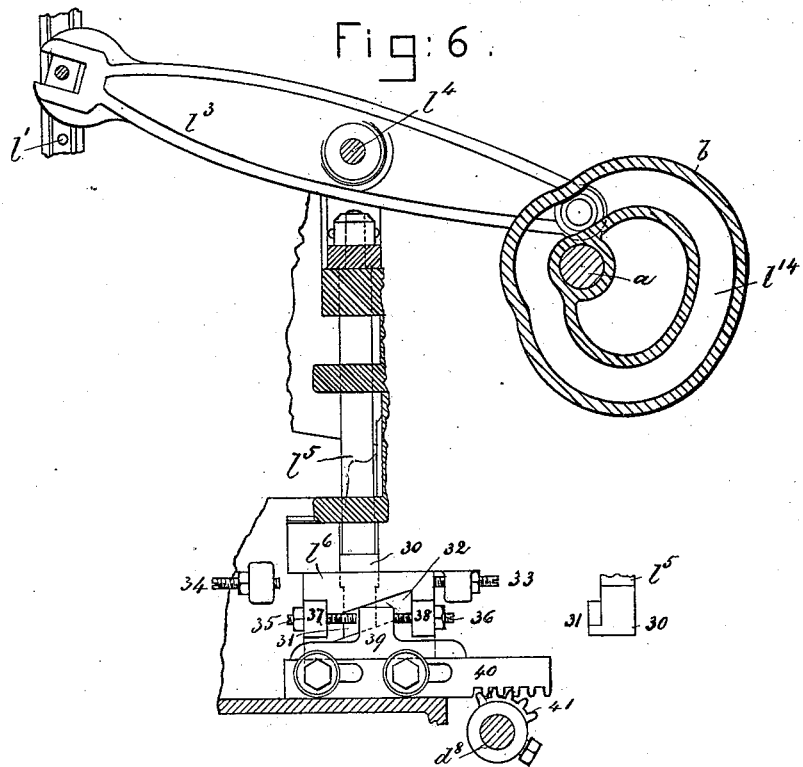
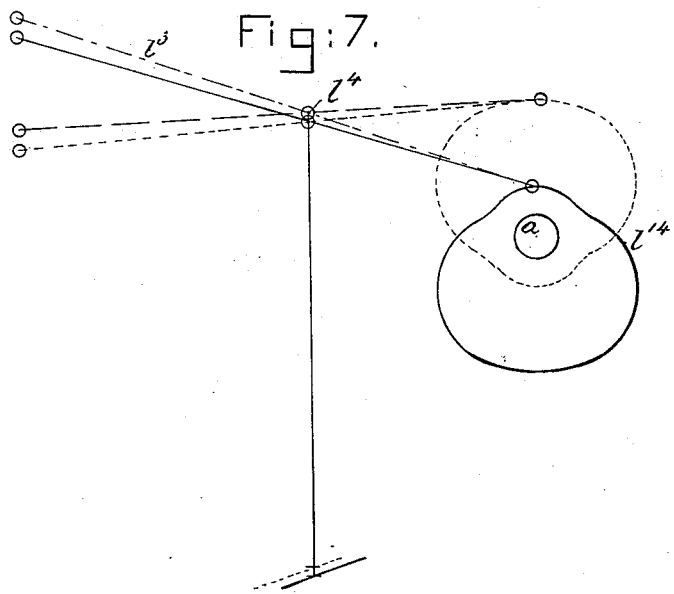

(No Model.) 10 Sheets—Sheet 5.
H. P. FAIRFIELD.
Nailing Machine for Boots and Shoes.
No. 236,568. Patented Jan. 11, 1881.
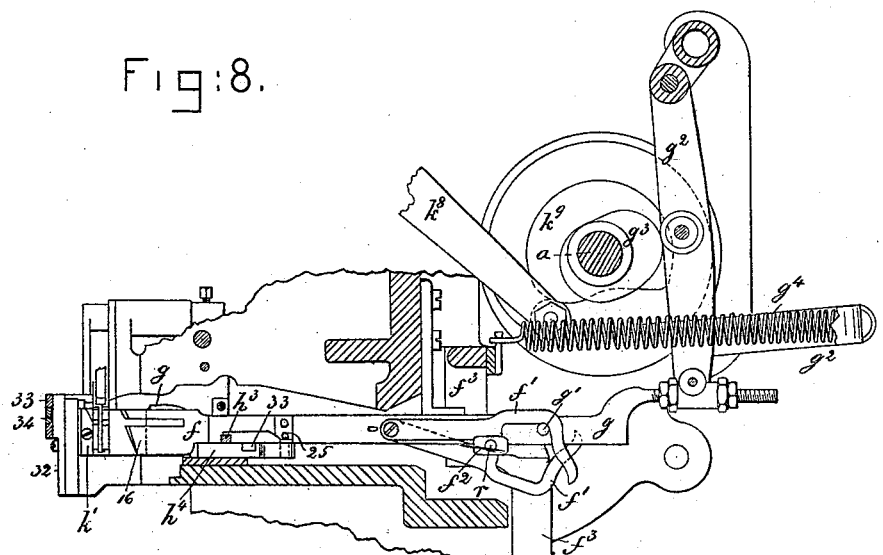
Fig: 8.
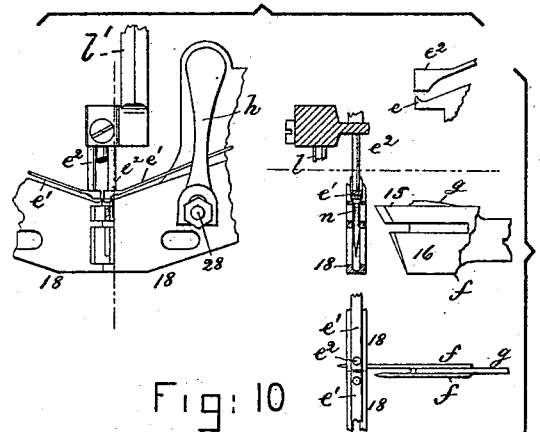
Fig: 9
Fig: 10
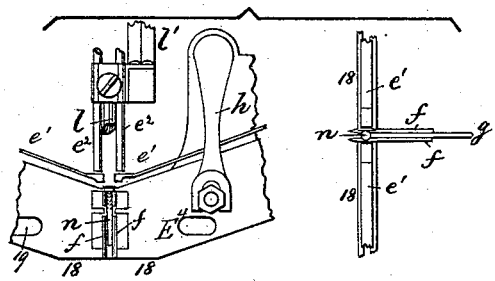
Fig: 11.
Witnesses.
L. F. Connor.
Arthur Reynolds
Inventor–
Hadley P. Fairfield
by Crosby Gregory Attys.

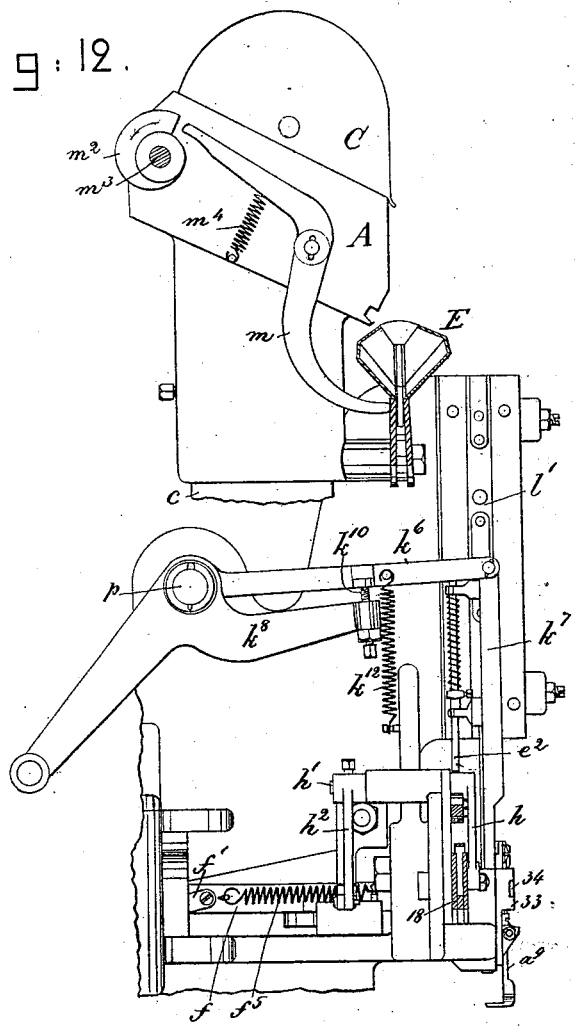

(No Model.)  10 Sheets—Sheet 7.
H. P. FAIRFIELD.
Nailing Machine for Boots and Shoes.
No. 236,568.  Patented Jan. 11, 1881.
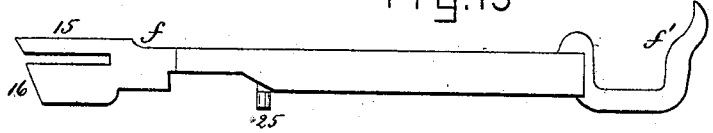
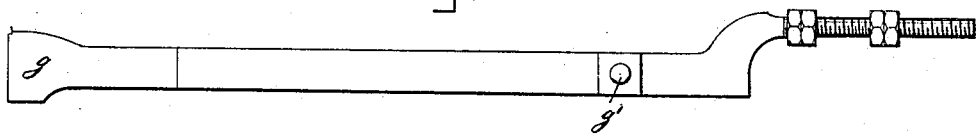
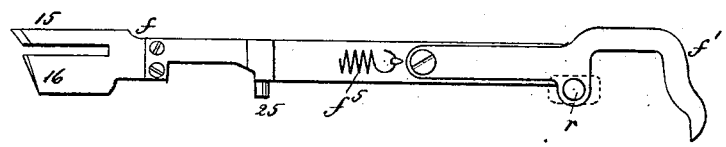
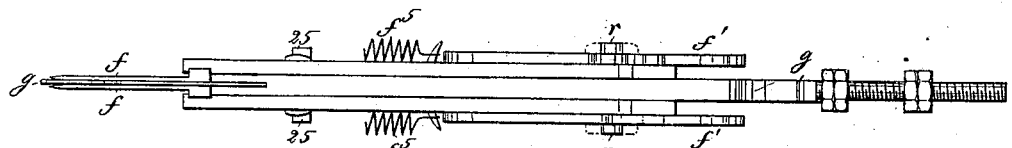
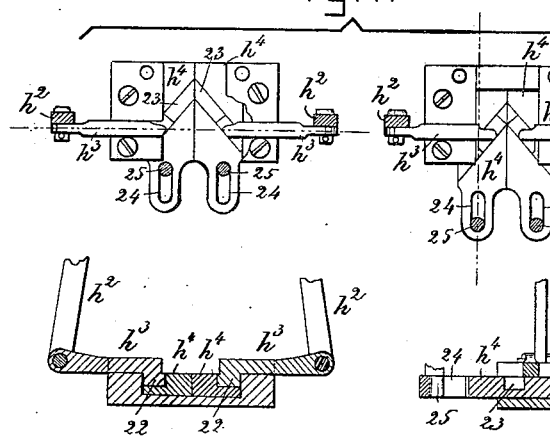
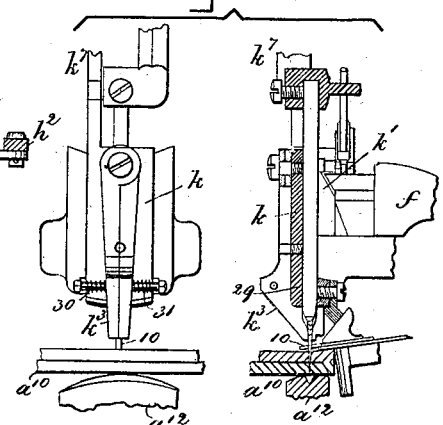
Witnesses.
L. F. Connor.
Arthur Reynolds.
Inventor.
Hadley P. Fairfield
by Crosby Gregory Attys (No Model.) 10 Sheets—Sheet 8.

H. P. FAIRFIELD.
Nailing Machine for Boots and Shoes.
No. 236,568. Patented Jan. 11, 1881.

Witnesses.
L. F. Connor.
Arthur Reynolds

Inventor.
Hadley P. Fairfield
by Crosby & Gregory Attys.

N. PETERS, PHOTO-LITHOGRAPHER, WASHINGTON, D. C.

(No Model.) 10 Sheets—Sheet 9.

H. P. FAIRFIELD.
Nailing Machine for Boots and Shoes.

No. 236,568. Patented Jan. 11, 1881.

Witnesses.
L. F. Connor
Arthur Reynolds

Inventor.
Hadley P. Fairfield
by Crosby Gregory Attys (No Model.) 10 Sheets—Sheet 10.
H. P. FAIRFIELD.
Nailing Machine for Boots and Shoes.
No. 236,568. Patented Jan. 11, 1881.
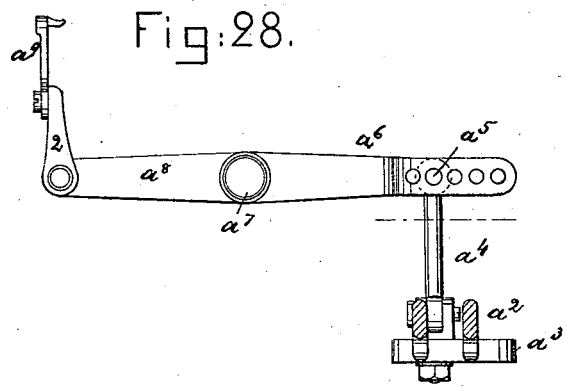
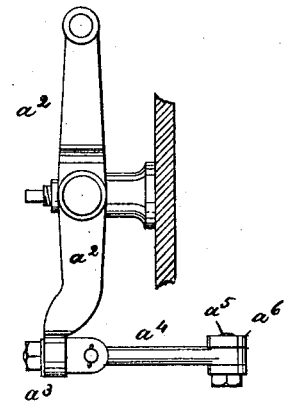
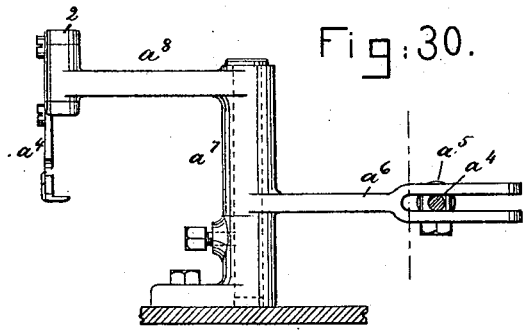
Witnesses
L. F. Connor.
Arthur Reynolds
Inventor
Hadley P. Fairfield
by Crosby Gregory Attys.

UNITED STATES PATENT OFFICE.

HADLEY P. FAIRFIELD, OF WEST MEDFORD, ASSIGNOR TO GORDON McKAY, OF CAMBRIDGE, MASSACHUSETTS.

NAILING-MACHINE FOR BOOTS AND SHOES.

SPECIFICATION forming part of Letters Patent No. 236,568, dated January 11, 1881.

Application filed October 25, 1880. (No model.)

*To all whom it may concern:*

Be it known that I, HADLEY P. FAIRFIELD, of West Medford, county of Middlesex, and State of Massachusetts, have invented an Improvement in Nailing-Machines for Boots and Shoes, of which the following description, in connection with the accompanying drawings, is a specification.

This invention relates to nailing-machines, especially adapted for boot and shoe work, wherein more than one length of nail is used, and is an improvement on United States Patents Nos. 189,836 and 189,837, April 24, 1877, to which reference may be had.

In this machine the separate headed nails or tacks are automatically lifted from separate nail or tack receivers, where they are suspended by their heads and deposited in independent raceways, and have co-operating with them nail-separating surfaces, which act to close the end of one of either of the said raceways and permit the intermitting delivery of separate nails from the other raceway to be driven by the driver. The said nails are moved laterally into the driver-passage of the nail-tube, when the driver descends, acts upon the head of each nail, and drives it from the centering-jaws, which latter form a continuation of the nail-tube. The nail having been placed between the centering-jaws, the latter descend with the driver until the lower end of the jaws rests upon the stock, when the jaws stop, and the driver, continuing its descent, drives the nail below the jaws and partially into the stock. The heads of the nails are left above the stock or sole for a distance sufficient to insure that the nail, when subsequently fully driven through the outer sole and inner sole on the last, will be clinched at the inner face of the inner sole by the metal surface of the last. The sole, be it a single or tap sole, is sustained on an unyielding post or support, and the nails of different length are all so driven that their points reach substantially to the inner face of the sole resting upon the said post. To do this the driver-bar and driver have given to them a variable stroke, to accommodate nails of different lengths—the shorter the nail the nearer the descent of the driver to the post or support, and vice versa. This variation in the descent of the lower end of the driver for nails of different lengths is accomplished by automatically raising and lowering the fulcrum of the driver-lever, it being lowered for the shorter nails. Simultaneously with this change of fulcrum of the driver-lever the separating-surfaces then to operate with that raceway, having nails of the length to be used with the driver-lever fulcrum in that position, is also thrown into operative condition, and the movement of the separator-surface for the other raceway is suspended, the latter during such suspension acting merely as a cover for the end of the raceway next to it and not in use. At this same time the movement of the apparatus for delivering nails into the raceway previously in use is discontinued, and that for supplying nails of the other length is started.

The mechanism herein to be described is so constructed that one half of it controls the delivery to the driver-passage and nail-tube of nails of one length, and the other half of nails of another length. Consequently, when one half is in operation the other half is at rest, and the change from one to the other length of nail, thus stopping the operation of one half and starting the other half into operation, is effected simultaneously, and, in this instance of my invention, by a single shaft under control of a foot or other lever. The change from a nail of one to that of another length is effected instantaneously, so that a long nail may follow a short one at any time, and vice versa, and these changes for a long or short nail may be made at any position of the machine without the possibility of, at the same time, getting two nails into the driver-passage, which is a great evil.

Each separator is moved forward to remove a nail from its raceway by means of a spring, and is moved backward positively; and should the separator be obstructed by a nail, the failure of the separator to complete its forward movement acts to automatically arrest the operation of all the mechanism instrumental in selecting nails from the raceway.

Each raceway has at different points of its length short or abrupt inclines, which causes each nail when passing down it to move quickly from the nail next behind it, thus preventing the heads of the nails overriding, and, owing to the separation of the nails at these inclines, it is possible to make sufficient space between a series of nails properly suspended in the raceways for the reception of the body of a nail which may have been lying horizontally upon the heads of other nails in the raceway.

To provide for the certain discharge from the raceway of a nail which has not dropped properly between the walls of the raceway, I have provided the raceway with an abrupt bend, so that all the nails properly suspended in the raceway are deflected quickly from their original line of motion, while the misplaced nails, not being so restrained, are by their momentum thrown from the other nails.

Figure 20:
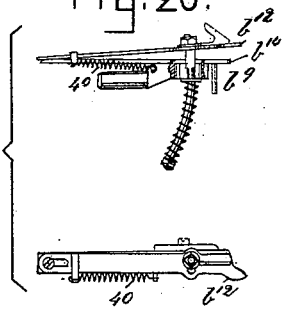
Figures 21, 22, 23:
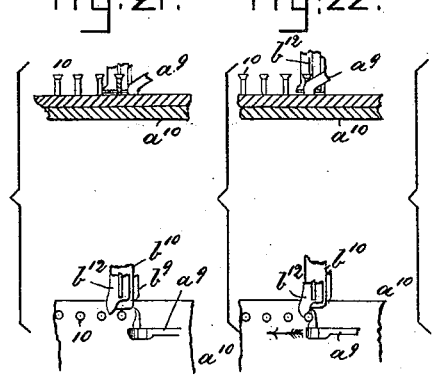
Figure 24:
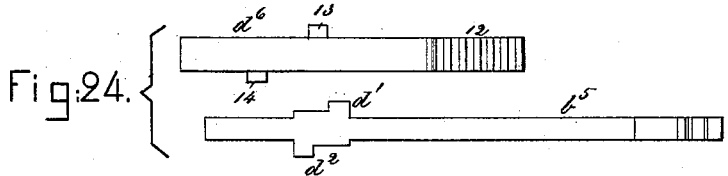
Figure 25:
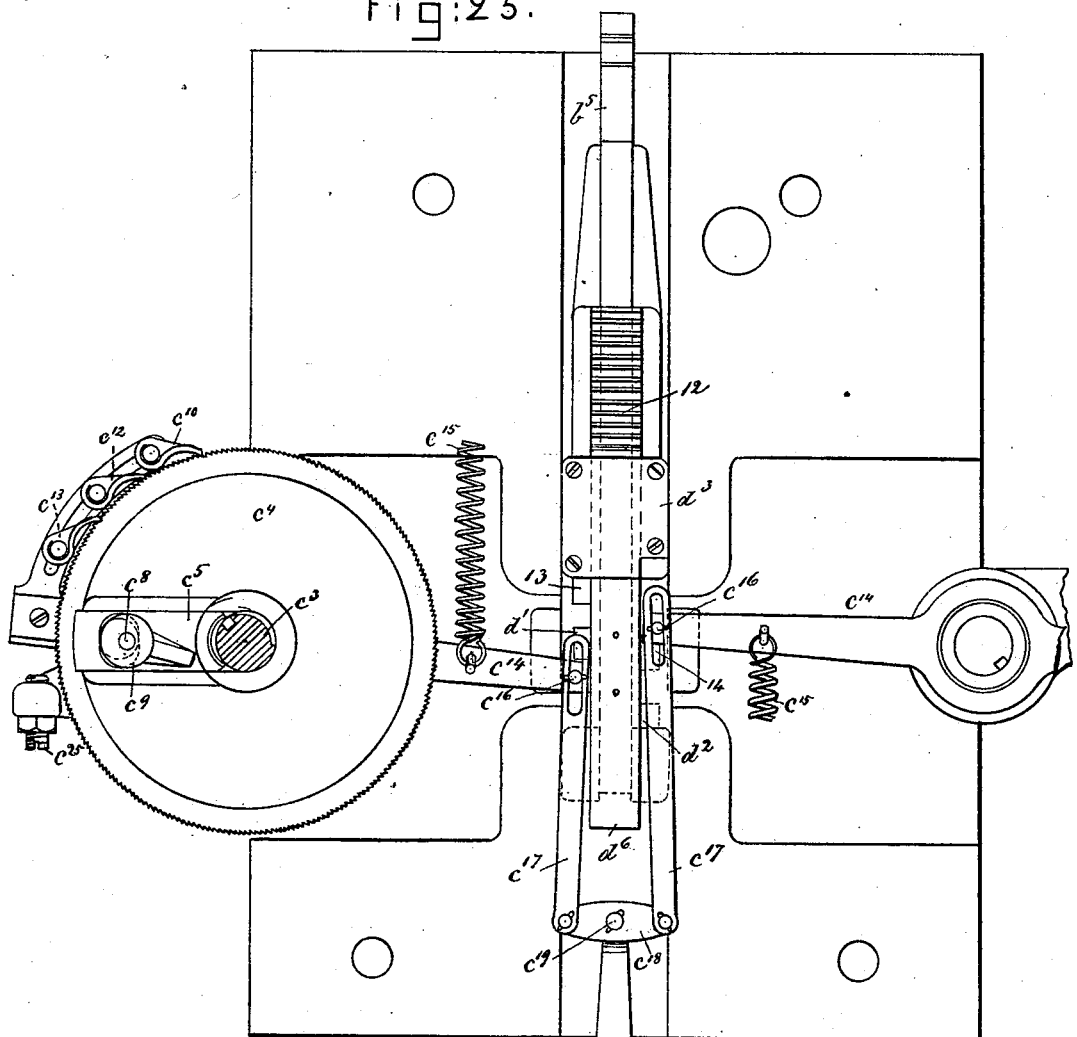
Figure 26:
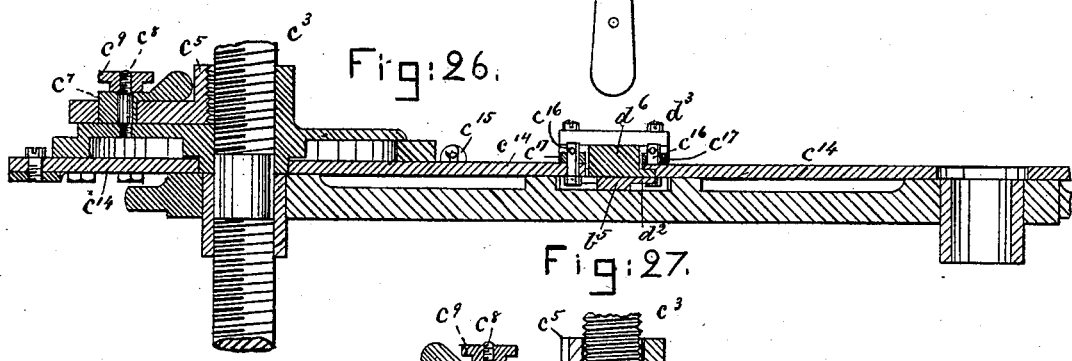
Figure 27:
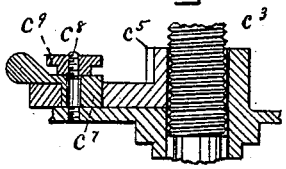

Figure 1 is a front elevation of one of my improved nailing-machines, a portion of the machine at the left being broken away, because that part of the machine so omitted is in function, shape, and operation the same as at the right of the machine; Fig. 2, details showing the driver, pusher, jaws or nail-tube, separator, post or support, a piece of sole thereon, the feed-guide for the edge of the sole, the detent to prevent retrograde motion of the sole, and a nail partially driven; Fig. 3, a right-hand end elevation, partially in section; Fig. 4, a section of the nail-receiver near its lower end, the line of section being in the dotted line, Fig. 3; Fig. 5, a top view of Fig. 1; Fig. 6, a detail of the driver-lever, its adjustable fulcrum-post, and the mechanism for operating it to insure a variable driver-stroke; Fig. 7, a diagram illustrating the movements of the driver-lever; Fig. 8, a partial vertical cross-section, showing the separator and pusher and means to operate them; Figs. 9 and 10, details showing different portions of the ends of the raceways and of the separating-surfaces co-operating therewith; Fig. 11, details of the nail-pusher, jaws or tube, and driver; Fig. 12, a detail showing mechanism for operating the raceway, the jaws or nail-tube, and the striker for the raceway, the latter being in section. Fig. 13 is a side elevation of the separator for the left-hand raceway; Fig. 14, a side elevation of the pusher; Fig. 15, a side elevation of the separator for the right-hand raceway; Fig. 16, a plan view of the pusher and the two separators; Fig. 17, details of the devices to arrest the delivery of nails should the movement of the separator be obstructed by a nail; Fig. 18, details showing the jaws or tube elevated a little from the stock after the nail is driven; Fig. 19, details showing the edge-guide, the presser, and sole-detent, and also the mechanism for shifting the parts to feed long or short nails; Fig. 20, side and top view of the sole-detent, presser, and edge-guide; Figs. 21, 22, and 23, details illustrating the operation of the sole-feed and detent; Fig. 24, details of devices instrumental in the nail-feed; Fig. 25, details of ratchet mechanism for moving or arresting the movement of the nail-feeding devices; Fig. 26, a cross-section of Fig. 25 in the plane intersecting the feed-screws; Fig. 27, a detail showing the movable half-nut that controls the longitudinal movement of the nail-piston; Fig. 28, a detail showing, in top view, the rocker-shaft for moving the sole-feed, the lever $a^2$ in Fig. 3 being shown in section; Fig. 29, a side elevation of the lever $a^2$ and its connection with the rocker-lever $a^6$; and Fig. 30 is a side elevation of Fig. 28, the lever $a^2$ being omitted.

The main shaft $a$ of the machine, properly supported in the frame-work, has upon its right-hand end, near the fly-wheel $a^\times$, the grooved-edge cam $a'$, that receives a roller-stud at the upper end of a pivoted lever, $a^2$, (see Fig. 3,) slotted at its lower end, $a^3$. The slotted lower end of this lever has adjustably connected with it a jointed link, $a^4$, (shown in details, Figs. 28 to 30,) adjustably connected at its other end by a bolt, $a^5$, with an arm, $a^6$, of a rock-shaft, $a^7$, having an arm, $a^8$, extended horizontally to the front of the machine, where it has jointed with it a yoke, 2, upon which is adjustably mounted the sole-feed $a^9$, the forward end of the said feed acting at the proper time against the shank of a partially-driven nail, 10, as in Fig. 2, moving the sole or stock $a^{10}$ forward horizontally in the direction of the arrow over the stationary support $a^{12}$.

The second cam, $b$, is a disk having a groove upon each face. The groove $b'$, at the right face of the said disk, acts upon a pin or stud in one arm, $b^2$, of a rocker-shaft, the other arm, $b^3$, of which, at its lower end, is provided with a pin, $b^4$, that engages a notch at the end of the slide $b^5$, that moves the feed-levers of the nail-feed. (See Fig. 19.) This arm $b^3$ of the rocker-shaft is forked at its lower end and receives a pivoted block, $b^6$, through which is extended the screw-threaded end of a rod, $b^7$, connected with the elbow-lever $b^8$, which at its forward end is provided with the adjustable edge-gage $b^9$, the said lever also carrying the presser $b^{10}$ and the sole-detent $b^{12}$. Upon the outer end of this rod $b^7$ is a spring made adjustable by nuts $b^{14}$, to cause the presser to bear with more or less force upon the block $b^6$, so that the movement of the arm $b^3$ of the rocker-shaft against the said spring, as in Fig. 19, may be made to force the presser $b^{10}$ against the surface of the sole with more or less force while the nail is being driven therein; but when the sole-feed is to act upon a nail partly driven to feed the sole forward the cam $b'$ so operates the arm $b^3$ of the rocker-shaft as to relieve the sole from the effect of the presser.

The headed nails to be driven in the soles by this machine are placed in the receivers $c$ $c$, there being one at each side of the machine to receive nails of the two lengths to be employed, only one of the said receivers being shown, except in Fig. 5 of the drawings, where the left-hand receiver is shown with the brush, to be hereinafter referred to, removed from above it. Each receiver, as in Fig. 3, contains a piston, $c^2$, having preferably a conical face, and mounted upon the upper end of a screw, $c^3$, which is extended down through the receiver and through a ratchet-wheel, $c^4$, the said screw being so fixed at its lower end that it cannot rotate, it being held, however, by a feather, so as to permit it to rise under the action of the half-nut $c^5$, adjustably connected with the ratchet-wheel $c^4$, the rotation of the ratchet-wheel with its half-nut moving the screw $c^3$ and piston vertically, thus gradually elevating in the receiver all the nails above the piston. Each receiver, at its lower end, has a door, $d$, (see Figs. 3 and 4,) which may be opened when the piston has been lowered to the bottom of the receiver, to remove from the receiver the nails therein prior to adding nails of a different length. In order to lower the screw and piston the half-nut $c^5$ will be withdrawn from its engagement with the screw $c^3$, as in Fig. 27, to the position shown in Fig. 26, when, the threads of the half-nut being no longer in engagement with the threads of the said screw, the latter may be readily drawn down by hand, or will descend by gravity. This half-nut, as herein shown, is moved backward and forward by the eccentric $c^7$, adapted to be turned about a stationary pin, $c^8$, by a suitable thumb-piece connected with the eccentric. The eccentric is secured in adjusted position to prevent accidental turning by means of the thumb-nut $c^9$. Each ratchet-wheel $c^4$, having a series of quite fine teeth at its periphery, is engaged and moved through the medium of a series of pawls, $c^{10}$ $c^{12}$ $c^{13}$, on a pawl-carrying lever, $c^{14}$.

When nails of different sizes are employed it is necessary to move the pistons of the receivers $c$ $c$ at different rates of speed, each piston being operated at the proper speed to insure the proper presentation above the top of its receiver of a sufficient quantity of nails to keep the raceway in connection with it properly supplied with nails. In order to adapt the movement of these pistons to nails of various sizes the rate of speed of the screws must be adjusted to the greatest nicety, and I have therefore employed two or more pawls on each pawl-carrying lever, so as to divide each stroke of the pawl-carrying lever in such way that each pawl shall be affected during a stroke of the lever to move the ratchet-wheel for a distance less than that of one tooth.

The backward throw of the pawl-carrying lever $c^{14}$ is regulated by means of a stop, $c^{15}$. (Shown as an adjustable screw.) It is obvious the greater the number of the pawls the less the movement of the ratchet-wheel. The movement of the lever $c^{14}$ will be shortened by the screw $c^{15}$, to correspond with the desired movement to be given to the ratchet-wheel. Each pawl-lever $c^{14}$ is moved in one direction by a spiral spring, $c^{25}$, and in the other direction by one of the projections, $d'$ or $d^2$, of the reciprocating slide $b^5$. The two levers $c^{14}$ and their pawls are alike, with the exception that one lever, when it is active, is moved positively in the direction just opposite that of the other lever, in order to adapt them to lift the screws $c^3$, both threaded the same hand. To provide for this movement the two projections $d'$ $d^2$ are arranged as shown in Fig. 24, and so arranged the projection $d'$ operates the lever $c^{14}$ when the slide is moved forward and the said lever is in position to be struck by it, and the projection $d^2$, under like conditions, is operative on its lever $c^{14}$ when the slide is moved backward.

Each lever $c^{14}$ has a pin, $c^{16}$, which projects above and below it. The lower ends of these pins are struck by the projections $d'$ $d^2$ to move the levers positively when their pawls act upon the ratchets, and their upper ends enter slots at the ends of links $c^{17}$, jointed with the nail-feed stopping-lever $c^{18}$, pivoted at $c^{19}$, the said links and their slots being of such length that, when the lever $c^{18}$ is turned to the right from the position shown in Fig. 25, they will act upon the pins $c^{16}$ of the levers $c^{14}$, and push the said levers in opposition to their springs $c^{15}$, and so hold them that neither of the projections $d'$ or $d^2$ can strike the pin $c^{16}$, and consequently the nail-feed is stopped and the screws $c^3$ no longer rise.

It will be noticed that the slide $b^5$ is reciprocated constantly, and its projections $d^1$ $d^2$ will strike the pins $c^{16}$, if they are not moved out of their range and against the springs $c^{15}$. Both pins are moved out of their range by the lever $c^{18}$ and links $c^{17}$, as described, and to move one pin out of its range, so as to permit one of the nail-feeds to operate and the other to remain at rest, it is necessary to add a device which shall act upon one or the other of the said levers $c^{14}$, and so hold it that its pin $c^{16}$ cannot strike that one of the projections, $d'$ or $d^2$, next to it. For this purpose I have added the feed-shifting slide $d^6$, provided with two lugs, 13 14, and with a rack, 12, to be engaged by the sector $d^7$ on the rocker-shaft $d^8$, the said slide being moved forward or backward, and being there held during the time that each of the levers $c^{14}$ is to be operated for a nail of a certain length. When the slide $d^6$ is moved forward, so that the lug 13 acts on the lever $c^{14}$ at the left of Fig. 25, it so moves the lever as to place its pin $c^{16}$ beyond the range of motion of the projection $d'$ of the slide-bar $b^5$. When the slide $d^6$ is moved backward its lug 14 acts in a corresponding manner on the lever $c^{14}$ at the right of Fig. 25.

At the upper end of each receiver is a box, A, having at its lower end a slot, B, and connected with each box is a cover, C, having mounted in it the shaft of a roller-brush, D. This brush acts upon the top of the pile of nails or tacks gradually elevated by the plunger $c^2$, and sweeps them from the receiver into the said box A, the nails passing therefrom, through the slot B, into the V-shaped upper end of the inclined raceway E.

The upper part of the raceway, or that part upon which the nails rest, is provided with a series of inclines or shoulders, E', (see Fig. 1,) which causes each nail as it descends the said inclines to increase its motion and separate itself from the nail next back of it, thus preventing the heads of the nails overriding each other and separating the nails sufficiently far apart to permit the points of nails which may be lying upon the heads of the nails properly suspended between the walls of the raceway to fall into the said raceway and be suspended by their heads, after which the said nails continue in the raceway. To prevent a nail or nails so lodged upon the heads of other nails properly suspended in the raceway from clogging the raceway, I have provided the raceway with a rather abrupt bend or curve, as at $E^2$, to thus quickly deflect the properly-suspended nails from their horizontal line of movement, they passing along down the portion $E^3$ of the raceway underneath the cover $E^4$, all the nails lying upon the heads of the properly-held nails and unrestrained in their movement being, by their momentum, thrown from the raceway.

Each raceway at its delivery end has a short stop, $e$, (shown on a larger scale in Fig. 9,) to stop the lowermost nail in the raceway. Above each raceway, at its delivery end, is a spring nail-holder, $e'$, which is acted upon by a yielding depressing-rod, $e^2$, carried by the driver-bar $b'$, the said depressing-rods acting upon the holders $e'$ at each descent of the driver and driver-bar, depressing the holders firmly in contact with the heads of the nails under them, while the driver drives the nail last presented to the driver by the pusher $g$.

The lower end, 18, of each raceway, made longitudinally movable for a short distance by devices to be described, is notched, as in Figs. 9 and 10, to receive the fingers 15 16 of the separating-surfaces $f$, one for each raceway, and permit them to pass, one behind the endmost nail of the raceway which is then furnishing nails to be driven, and the other to close the end of the raceway. The movable part 18 of the raceway is slotted near its front end to receive a guiding pin or screw, 19, (see Fig. 1,) and at its rear end it has a slotted projection, 20, (see Fig. 1,) supported by a pin, (shown therein in section,) the said pins supporting the part 18, so as to permit it to be moved horizontally, for the purposes to be stated, by the arm $h$, connected with a rock-shaft, $h'$, the latter having an arm, $h^2$, provided at its lower end with a link or connecting-rod, $h^3$, herein shown (see Fig. 17) as provided with a foot, 22, to enter a groove, 23, in the controlling-slide $h^4$, having a slot, 24, to receive a pin, 25, of one of the separating-surfaces $f$, the devices and parts just enumerated being in duplicate at each side of the machine, to adapt the machine to nails of two lengths.

The separating-surfaces, besides the usual functions of a separator to permit the removal of separate nails, have in this my invention an additional function—viz., they stop the open or delivery end of that one of the raceways not being used, and also intermittingly open and close the delivery end of that raceway being used, to permit the escape of a loose nail at the proper time, the parts for separating and controlling the delivery of the nails or tacks being so made and co-operating each with the other as to absolutely prevent the introduction into the driver-tube or the delivery from the end of the raceways of more than one loose nail at each revolution of the machine-shaft $a$, or during the interval of one and the next descent of the driver, no matter at what part of the revolution of the said shaft the change which is required to make the shift from one to another length of nail shall be made, such provision enabling the operator to make the necessary change at any time during the revolution of the said shaft $a$ without interference with the proper nail-delivery.

I have herein shown the nail-separating surfaces as independent devices, either of which may be reciprocated to permit the escape of a formed nail, or may remain at rest, according to whether or not the raceway with which it co-operates is to be used. Each separator-shank has a V-hook pivoted upon it, and each V-hook is provided with a projection, $r$, to enter a groove, $f^2$, (see Fig. 19,) made in the lifting-link $f^3$. The V-hooks of the two separators are turned, the one up, as in Fig. 13, and the other down, as in Fig. 15. The pusher $g$, having a constant reciprocation, is provided with a pin, $g'$, to permit one or other of the V-hooks to be engaged with it, and thus move the separator at the proper time. The lifting-link $f^3$ is forked at its lower end, and is hooked over a crank-pin, $f^4$, carried by the segment $d^7$, and by moving the rock-shaft $d^8$ the lifting-link is raised to raise and lower the two V-hooks, the projections $r$ of which are in the grooves $f^2$, thus alternately engaging one of the said V-hooks with the pin $g$, and disengaging the other V-hook from said pin, that the separator the V-hook of which is so engaged with the said pin $g'$ may be reciprocated to permit the escape of a loose nail from that raceway with the end of which it is made to co-operate, while the other separator remains at rest and closes the delivery of the raceway not in operation.

Each separator $f$ has a pin, 25, which, as the separator is moved forward by spring $f^5$, acts in the groove 23 of the slide $h^4$, and so raises it that the link $h^3$ turns the arm $h^2$, shaft $h'$, and arm $h$, causing the said arm $h$, which engages pin 28 in the end 18 of the raceway, to move it backward away from the nail-tube, the slot 24 being enough longer than the diameter of the pin 25 to permit the separator to get in position between the endmost nail and the one next back of it, so that as the race end 18 is drawn back the endmost nail outside of the separator is stopped by the separator, and is removed from the end of the raceway ready to be driven. This provision of mechanism between the separator and end 18 of the raceway makes the movement of the raceway dependent upon the movement of the separator, and the separator must be moved forward to insure the movement of the end 18 of the raceway to discharge a nail. The separators are drawn back positively by the pin $g'$ of the pusher, herein shown as located between the two separators, the said pusher being employed because the nail-tube to be referred to is placed out of line with the delivery ends of the raceway-passages which are diametrically opposite. This pusher is moved back positively by means of a lever, $g^2$, set in motion by a cam, $g^3$, and is moved forward by a spring, $g^4$, the end of the lever $g^2$ being adjustably connected with the said pusher-shank to bring the acting end of the pusher in exact line with the inner wall of the nail-tube, the latter being cut away at its rear side to permit the introduction into it of a nail.

The nail-tube is composed of parts $k$ $k'$ $k^2$. The part $k$ is a block with a semicircular groove at its rear face for most of its length, the lower end, 29, of the block being bored to make a hole or passage to serve as a continuation of the semicircular groove, to thus permit the driver to pass through it, as in Fig. 11. The parts $k'$ $k^2$ are shown as independent fixed blocks having a groove between them to permit the passage of a nail between them as it is introduced into the driver-passage, the said blocks $k'$ $k^2$ constituting the rear walls of the said driver-passage.

Below the lower end of the nail-tube, and properly grooved to constitute a conical continuation of the driver-passage, is the nail-centering device $k^3$, it being composed of two jaws pivoted upon the block $k$ at $k^5$, suitable springs, 30 31, holding the jaws of the centering device together, so as to hold the nail frictionally and prevent its escape from the centering device, except when positively driven therefrom by the driver, the said jaws adapting themselves to nails of different sizes. The block $k$, with its attached centering device, is raised by the lever $k^6$, which is connected with the bar $k^7$, projected upward from the block $k$, the latter being held and directed in a straight course by the grooved part 32 of the frame-work, into which the said block is fitted to slide, it being held in the said grooved part by a suitable cap, 33. Upon this cap (see Fig. 1) is a finger, 34, to extend across the sole-feed and prevent it from swinging outward about its pivotal connection on the arm $a^8$ of the rocker-shaft, before described. The lever $k^6$, having its fulcrum at $p$, is lifted positively by a lever, $k^8$, having its fulcrum at the same point. This lever $k^8$ is actuated by the cam $k^9$ to lift the lever $k^6$, the adjustable screw $k^{10}$ permitting the lever $k^6$ to be raised more or less. The lever $k^6$ is thrown down by the spring $k^{12}$, the descent of the said lever permitting the lower end of the centering device to rest upon the surface of the sole; after which, with the driver still on the head of the nail, the centering device is lifted by the lever $k^6$ from above the nail, to permit the sole-feed $a^9$ to engage the partially-driven nail 10 and feed the sole forward. The centering device rises until it and the part 29 of the block $k$ reach the blocks $k'$ $k^2$, when a nail is again inserted into the nail-tube, ready to be driven by the driver. The driver is connected with the driver-bar $l'$, guided in the usual manner, and actuated by a lever, $l^3$, and cam $l^4$. This lever $l^3$ is adapted to give to the driver a variable stroke for nails of different lengths, and to do this the fulcrum $l^4$ of the said lever is made adjustable automatically, the driver acting to drive nails of different lengths and leave their points just at the under side of the sole into which they are driven. This fulcrum is located at the forked top of a rod, $l^5$, squared at its lower end, 30, to prevent it turning around and to guide it, the said squared portion being provided with a right-angled projection, 31, (see small detail at right of Fig. 6,) to enter a diagonal slot, 32, in a horizontally-movable carriage, $l^6$, the movements of which in each direction are restricted by the adjusting-screws 33 34. This carriage has other adjusting-screws, 35 36, held in ears 37 38, projected laterally from one face of the carriage. Between these screws 35 36 is placed a lug, 39, on a rack-bar, 40, engaged by a sector, 41, so as to be moved by the rock-shaft $d^8$, which will be turned in one direction for one length of nail by the link 42, connected with a suitable treadle, (not shown,) the said treadle, in the position of the shaft $d^8$, (shown in Fig. 3,) being held locked by a suitable treadle-catch, the said shaft $d^8$ deriving its movement in the opposite direction by a suitable retracting-spring coiled about it, one end of the said spring being shown at 44. By adjusting the screws 33, 34, 35, and 36 into suitable positions, the movement of the parts 39 40 being always alike, it is possible to adapt the two positions of the fulcrum $l^4$ to two nails of any desired length within the capacity of the machine to drive. Fig. 7 is a diagram showing the two positions which the lever and its fulcrum will occupy when driving nails of two different lengths. This shaft $d^8$ is instrumental in operating all the devices to insure a change from a nail of one to a nail of another length. If a nail, 10, was driven by the driver at its last descent, the sole-feed, as it is moved forward, will strike the said nail and feed the sole forward until the said nail strikes the sole-detent $b^{12}$, (see Fig. 22,) which is pushed back against the stress of the spring 40, and as the nail 10 passes the sole-detent the latter falls behind it.

When feeding the sole the operator usually holds his hand upon it, and invariably, though unnecessarily, assists the feed movement, and in so doing is apt to feed the sole forward when a nail was not driven. This sole-detent, acting as a back stop to the nail, enables the operator to constantly exert a tendency to move the sole backward or in opposition to the movement to be given to it by the sole-feed, and in such way the nail driven into the sole may, by a backward movement of the sole, be kept just in front of the sole-detent, thus insuring that the next nail to be driven will be driven at the proper distance from the nail last driven.

The striker $m$, one for each raceway, is operated in one direction by a cam, $m^2$, on a shaft, $m^3$, and in the other direction by a spring, $m^4$. This shaft $m^3$ is rotated by means of a band, $m^5$, (see Fig. 5,) extended from a grooved pulley, $m^6$, on shaft $a$, to a second grooved pulley, $m^7$, on the shaft $m^3$. This shaft $m^3$ has fixed to it two pulleys, 44 45, which, by suitable bands 46, are each connected with a grooved pulley, $t$, and so as to rotate the shaft of the roller-brush D at the proper speed.

Like parts are mostly designated by like letters at both sides of the machine.

I claim—

1. In a nailing-machine, a driver having a variable stroke, two separate raceways to support separate nails by their heads, and separating-surfaces co-operating with the raceways to close either of the said raceways and open the other raceway for the delivery singly therefrom of nails to be driven, substantially as described.

2. In a nailing-machine, two raceways to support separate nails of different lengths by their heads, and separating-surfaces co-operating with the said raceways to close the end of either of them and permit the delivery of nails singly from the other one, a driver and driver-bar, and intermediate mechanism adapted, substantially as described, to make the movement of that raceway next to deliver a nail to be driven dependent upon the movement of the separating-surface for that raceway, as set forth.

3. In a nailing-machine, two diametrically-opposite raceways to support separate nails by their heads, and independent separating-surfaces to co-operate therewith and insure the discharge of a nail from but one of either of the said raceways, at will, into the space between the delivery ends of the said raceways, substantially as described.

4. The raceway provided along its upper surface or edge with inclines to accelerate the movement of the nails as they pass down the said inclines and remove one nail from another, as set forth.

5. The raceway provided with the abrupt bend to suddenly change the direction of movement of the nails properly supported in the raceway by their heads, such change of movement insuring the dislodgment of all the nails carried upon the heads of the properly-supported nails, substantially as described.

6. The nail-receiver and movable piston therein, combined with the ratchet-wheel and two or more pawls to operate the same for a distance less than the length of one tooth of the said ratchet, substantially as described.

7. The combination, with the receiver and piston therein, of a brush to gradually remove into the raceway the nails lifted by the piston, substantially as described.

8. The two pawl-carrying levers $c^{14}$, to move the two ratchet-wheels $c^4$, and the movable projections to actuate the said levers, combined with the feed-shifting slide adapted to act upon the said levers and place one or the other of them, as may be desired, out of the range of movement of the projections which actuate the said levers, substantially as set forth.

9. The lever $l^3$ and its variable fulcrum, and the adjustable carriage having an inclined slot or surface to raise or lower the said fulcrum, combined with a slide to move the said carriage more or less in either direction, as may be desired, to adapt it to properly change the position of the said fulcrum to insure the driving of nails of any two distinct lengths within the capacity of the driver, substantially as described.

10. The pawl-carrying levers $c^{14}$, to operate the ratchet-wheels for the nail-feeding mechanism, combined with the slotted links to move both of the said levers in opposition to their springs and prevent the said levers from being actuated when it is desired to completely stop both of the nail-feeding mechanisms.

11. The raceway and nail-holder $e'$, combined with the depressing-rod $e^2$, to retain the holder upon the head of the endmost nail as the separator is being moved forward between it and the next nail in the raceway, substantially as described.

12. The nail-receiver provided at its lower end with a door to permit the removal of nails therefrom when it is desired to supply the receiver with nails of another length, substantially as described.

13. In a nailing-machine, the sole-feed to act upon a partially-driven nail, combined with a sole-detent, as and for the purpose substantially as described.

14. The nail-tube composed of the movable block grooved at its rear side, having its lower end, 29, bored for the passage of the driver, and the two stationary blocks $k' k^2$, forming the rear-side of the nail-tube, the said blocks having a passage between them for the introduction of a nail into the nail-tube, combined with the centering-jaws connected with the block $k$, substantially as described.

In testimony whereof I have signed my name to this specification in the presence of two subscribing witnesses.

HADLEY P. FAIRFIELD.

Witnesses:
G. W. GREGORY,
ARTHUR REYNOLDS.